United States Patent [19]
Hida

[11] Patent Number: 5,143,668
[45] Date of Patent: Sep. 1, 1992

[54] PROCESS FOR MAKING A REACTION-SINTERED CARBIDE-BASED COMPOSITE BODY WITH CONTROLLED COMBUSTION SYNTHESIS

[75] Inventor: George T. Hida, Amherst, N.Y.

[73] Assignee: Benchmark Structural Ceramics Corporation, Amherst, N.Y.

[21] Appl. No.: 728,235

[22] Filed: Jul. 10, 1991

Related U.S. Application Data

[63] Continuation-in-part of Ser. No. 254,108, Oct. 6, 1988, Pat. No. 5,032,332.

[51] Int. Cl.$^5$ ............................................. C04B 35/65
[52] U.S. Cl. ........................................ 264/63; 264/65; 264/66; 264/80; 501/87
[58] Field of Search ................... 264/63, 65, 66, 80; 501/89

[56] References Cited

U.S. PATENT DOCUMENTS

| | | | |
|---|---|---|---|
| 1,918,317 | 7/1933 | Benner et al. | 501/88 |
| 2,854,364 | 9/1958 | Lely | 148/1.5 |
| 2,862,795 | 12/1958 | Lowe | 23/208 |
| 2,886,454 | 5/1959 | Todd | 106/43 |
| 3,375,073 | 3/1968 | McMullen | 23/204 |
| 3,704,230 | 11/1972 | Loricchio | 252/182 |
| 4,069,060 | 1/1978 | Itayashi | 106/65 |
| 4,284,612 | 8/1981 | Horne | 423/345 |
| 4,990,295 | 2/1991 | Hida | 264/65 |
| 5,006,290 | 4/1991 | Hida | 501/89 |
| 5,032,332 | 7/1991 | Hida | 264/66 |

OTHER PUBLICATIONS

"Study of Solid-State Alumino Thermal Reactions: Influence of Activation and Moderation Processes," George T. Hida (Thesis, Israel Institute of Technology, Haifa, Israel, (Apr. 1987).

*Primary Examiner*—James Derrington
*Attorney, Agent, or Firm*—Howard J. Greenwald

[57] ABSTRACT

There is disclosed a process for preparing a sintered ceramic composite which is comprised of alumina and metal carbide. In the first step of this process, a mixture of silica, aluminum material, and carbon is comminuted until a substantially single-phase material is produced. In the second step of the process, the single phase material is granulated and formed into a green body. Thereafter, the green body is preferably packed in inert powder, placed into a closed reactor, and ignited.

14 Claims, 1 Drawing Sheet

PROCESS FOR MAKING A REACTION-SINTERED CARBIDE-BASED COMPOSITE BODY WITH CONTROLLED COMBUSTION SYNTHESIS

CROSS-REFERENCE TO RELATED PATENT APPLICATION

This is a continuation-in-part of U.S. Ser. No. 07/254,108, filed on Oct. 6, 1988, now U.S. Pat. No. 5,032,332.

FIELD OF THE INVENTION

A process for preparing a reaction-sintered carbide body which is comprised of alumina and silicon carbide and/or titanium carbide and/or transition metal carbide(s).

BACKGROUND OF THE INVENTION

Ceramic composites comprised of silicon carbide and alumina are well known to the prior art. However, these composites often require a substantial amount of energy and expense to produce such composite materials. In addition, these composites usually also requires a substantial amount of energy and expense to form them into green bodies and to sinter them.

To the best of applicant's knowledge, no prior art reference has disclosed a process in which a monolithic body comprised of a metal carbide and alumina can be prepared in one step.

It is an object of this invention to provide a process for preparing a sintered body comprised of alumina and metal carbide(s) in which the material is simultaneously synthesized and sintered.

SUMMARY OF THE INVENTION

In accordance with this invention, there is disclosed a process for preparing a sintered ceramic composite which is comprised of alumina and metal carbide. In the first step of this process, a mixture of silica, aluminum material, and carbon is comminuted until a substantially single-phase material is produced. In the second step of the process, the single phase material is granulated and formed into a green body. Thereafter, the green body is preferably packed in inert powder, placed into a closed reactor, and ignited while being blanketed with a gas comprised of hydrogen.

DESCRIPTION OF THE DRAWING

The present invention will be more fully understood by reference to the following detailed description thereof, when read in conjunction with the attached drawing, wherein.

DESCRIPTION OF THE PREFERRED EMBODIMENTS

Figure 1:
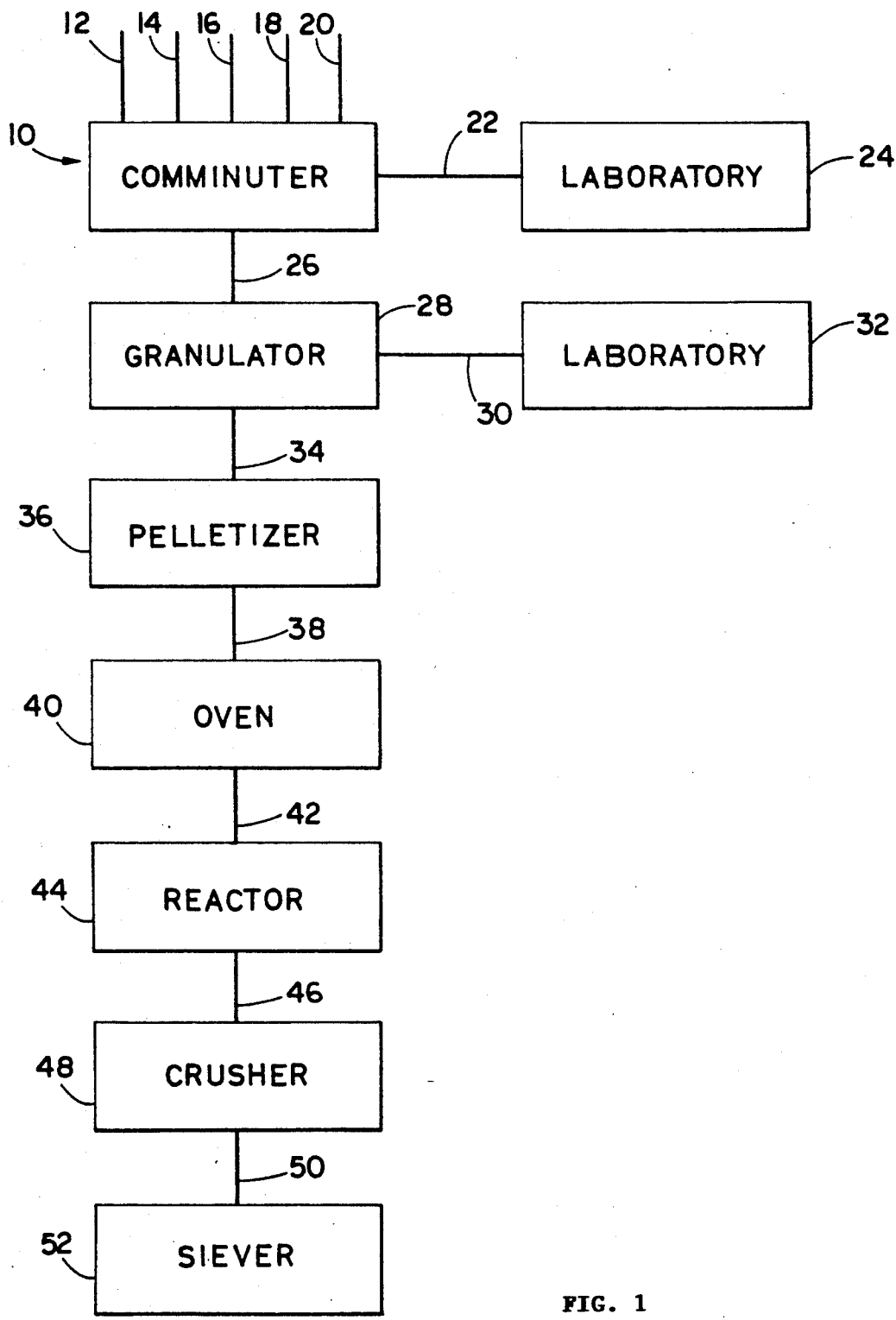
FIG. 1 is a flow chart illustrating the preferred process of this invention.

In the first step of the process of this invention, a single-phase material is produced by comminution from a mixture of aluminum material, silica, and carbon. In one preferred embodiment of the invention, the mixture also may contain a moderator, such as alumina and/or silicon carbide. Referring to FIG. 1, to mill 10 is charged aluminum material via line 12. The aluminum material may be either aluminum and/or aluminum alloy, and it preferably is in powder form and will have a specific surface area of from about 0.2 to about 1.1 square meters per gram and, preferably, from about 0.6 to about 0.7 square meters per gram.

Either pure aluminum, aluminum alloy material, or mixtures thereof may be used. Suitable aluminum alloys include, for example, alloys of aluminum with lithium, silicon, magnesium, manganese, iron, and the like.

In one embodiment, the aluminum material used is in the form of fine aluminum flakes. Thus, by way of illustration, one may use fine aluminum flakes obtainable from the Riedel de Haen Company of West Germany (catalog number 110100). This material is a coated aluminum comprised of 94 percent aluminum and less than 0.1 percent of oxygen; and at least about 80 percent of these flakes are smaller than 9 microns.

In the process of this invention, the specified weight ratio of aluminum is based upon the concentration of pure aluminum. When an aluminum alloy material is used, or when a mixture of aluminum and aluminum alloy material is used, the aluminum content of the alloy is first calculated, and this aluminum content may then be used to determine the aluminum content.

The particle size distribution of the aluminum material will range from about 4 to about 28 microns and, preferably, will be from about 6 to about 12 microns. Particle size analysis may be conducted by means well known to those skilled in the art. Thus, for example, one can use the procedure described on pages 8-2 to 8-8 of Perry and Chilton's "Chemical Engineers' Handbook," Fifth Edition (McGraw-Hill Company, N.Y., 1973). The Perry and Chilton book also describes the specific surface area test described elsewhere in this specification (see, e.g., page 8-7); the disclosure of the entire Perry and Chilton book is hereby incorporated by reference into this specification. Test methods are also described in the 1988 Annual Book of ASTM Standards, Section 02, Volume 02.05 (ASTM, 1916 Race Street, Philadelphia, Pa., 1988), the disclosure of which is hereby incorporated by reference into this specification.

At least about 80 weight percent of the aluminum particles will have diameters of from about 6 to about 12 microns. It is preferred that at least about 85 weight percent of the aluminum particles have a diameter of from about 6 to about 12 microns. In an even more preferred embodiment, at least about 90 weight percent of the aluminum particles have a diameter of from about 6 to about 12 microns.

In one embodiment, the aluminum material contains from about 0 to about 1.0 percent, by weight of aluminum material, of combined oxygen. As used in this specification, the term combined oxygen refers to oxygen which is combined with aluminum and/or aluminum alloy and, usually, is in the form of a metal oxide. The amount of combined oxygen is determined by evaluating the total oxygen present by conventional means such as, e.g., spectral analysis.

In general, from about 17 to about 34 weight percent of aluminum (by total weight of aluminum, silica, and carbon) is charged to mill 10. It is preferred to use from about 19 to about 33 weight percent of aluminum.

Referring again to FIG. 1, amorphous carbon is charged to mill 10 via line 14. In general, from about 11 to about 24 weight percent (by total weight of aluminum, silica, and amorphous carbon) is charged via line 14 to mill 10. It is preferred to use from about 15 to about 19 weight percent of amorphous carbon.

Any amorphous carbon material known to those skilled in the art may be used in the process. Thus, by way of illustration, one can use carbon black obtained from the Pelleter Company of the United States (code "SRF") which has a specific surface area of 27.1 square meters per gram and is comprised of 99.28 percent of carbon, 0.37 percent of hydrogen, 0.03 percent of sulfur, 0.25 percent of ash, and 0.07 percent of oxygen. By way of further illustration, one can use amorphous carbon obtainable from the Aldrich Chemical Company, Inc. of 940 West Saint Paul Avenue, Milwaukee, Wis. and sold as code 27,720-7 in the 1988–1989 Aldrich catalog.

It is essential that the carbon used in the process of this invention be amorphous and have a specific surface area of at least about 4 square meters per gram. The specific surface area may be determined by means well known to those skilled in the art. Thus for example, specific surface area, or the surface area per unit mass of material (square meters per gram) can be measured by using gas adsorption techniques via the well known BET equation. This measurement can be conducted on a Micromeritics Flow Sorb II 2300, model 2300/00000/00 (made by Micromeritics Company, Norcross, Ga.). The test procedure is described in the instruction manual for this machine (see, e.g., Manual P/N: 230/42804/00, published by Micromeritics in 1985). As is known to those skilled in the art, this measurement also may be conducted on the Monosorb model MS-4 single point analyzer or the Quantosorb QS-7 multi-point analyzer, both of which are manufactured by the Quantachrome Corporation of 6 Aerial Way, Syosset, N.Y. 11791.

In one preferred embodiment, the amorphous carbon contains less than about 1.5 percent, by weight of carbon, of combined sulfur. The amount of combined sulfur may be determined by means well known to those skilled in the art. Thus, by way of illustration, one can use the combustion method described on pages 9-4 to 9-5 of said Perry and Chilton's "Chemical Engineers' Handbook."

Referring again to FIG. 1, silica is charged to mill 10 via line 16. To mill 10 is charged from about 55 to about 63 weight percent of silica (and, preferably, from about 58 to about 60 weight percent), by total weight of aluminum, amorphous carbon, and silica.

Some or all of the silica may be replaced by a material which contains silica, in free or combined form. Thus, for example, one may use uncombined silica, and/or aluminum silicates, magnesium silicates, and/or other silicates known to those skilled in the art. When a silica-containing material is used, the concentration of silica in such material is calcualated, and that is the concentration used in the process of this invention.

By way of illustration, a suitable silica which may be used in the process of this invention is "Cab-O-Sil M-5" Fumed Silica, an amorphous silicon dioxide manufactured by the Cabot Corporation, Cab-O-Sil Division, of Tuscola, Ill. 61953; this silica has a specific surface area of 200 plus or minus 25 square meters per gram; and the total oxygen content of this silica indicates that it contains less than 1.0 percent of silicon-silicon bonds.

The silica used in the process of this invention preferably has a specific surface area of from about 1.2 to about 400 square meters per gram.

The silica used can be either amorphous or crystalline. As used in this specification, the term amorphous refers to a solid substance which, although it may possess microcrystals, does not indicate the existence of any crystalline structure with X-ray diffraction. Even though the amorphous material may possess some degree of crystallinity, such crystallinity is less than that required for detection with X-ray diffraction technology. Thus, for example, a solid material which does not crystallize and which does not possess definite geometrical shape (as determined by X-ray diffraction analysis) is amorphous within the meaning of this invention.

The term crystalline, as used in this invention, indicates a substance which, when subjected to X-ray diffraction analysis, indicates the presence of crystals.

It is preferred that the silica used in the process of this invention be amorphous.

In addition to the aluminum, the amorphous carbon, and the silica, moderator material may be charged to mill 10 via line 18. In general, a sufficient amount of moderator may be used so that the weight/weight ratio of moderator to the combined weight of aluminum, silica, and carbon reactants is from about 0.0 to about 0.3. As will be apparent to those skilled in the art, the amount of moderator used cannot exceed the concentration which will stop the self-sustaining exothermic reaction which occurs between the aluminum, carbon, and silica reactants after ignition thereof.

The moderator may be the silicon carbide/alumina composite. Alternatively, or additionally, the moderator may be silicon carbide only, alumina only, mixtures of silicon carbide and alumina, other inert materials, etc. Suitable inert materials include, e.g., graphite powder or fiber, and refractory ceramic oxide or non-oxide materials.

Without wishing to be bound to any particular theory, applicant believes that moderation permits control of the reaction and the use of thermal energy freed during the process. Any possible means of moderation should have the capacity of slowing down the reaction rate in some degree and influencing one of the elementary processes of the reaction kinetics (such as the chemical process proper, the diffusion of reactants, nucleation, and crystal growth of products).

Moderation may be achieved by a decrease of the reaction rate caused by a reduction in the surface energy of the reactants. Such a reduction can be caused by increasing grain sizes, covering the grains with a thin layer of inert oxide, or adsorption on the reactant surface of a mono- or poly-molecular layer of a surface-active agent.

Moderation may be achieved by partial absorption of the energy generated by the reaction. This absorption can occur in a fluidized bed reaction with continuous injection and cyclic ignition; in this embodiment, the thermal energy obtained is rapidly removed from the system and can be used for other purposes. This adsorption can occur with the introduction of inert substances which do not react with either the reactants or the products but absorb part of the thermal energy released during the reaction; these substances are mixed in the reactant composition and undergo physical transformations (melting, for example). This absorption can be effected by introduction of chemically inert substances which do not react with either the reactants or products but interpose themselves between the reactants and, during the sintering process, are sintered together with reaction products.

The moderator substance may act by densifying the reaction product and, by that, reducing the reactant diffusion rate. Alternatively, the moderator may aggregate the more mobile reactant, causing it to diffuse from the interior to the surface of the inert substance and only after that through the product layer to the reaction zone.

Moderation may result from introduction of active substances which enter into weak exothermic or even mildly endothermic reactions with the reaction product. In this case, one may obtain valuable secondary products sintering jointly with the main reaction products. One may create an oxidizing, reducing, or inert environment in the course of the reaction, simultaneously increasing the pressure under which the reaction takes place.

The moderator preferably used in the process of the invention does not leave the reaction system during combustion and/or sintering. Thus, for such a moderator, one may use reaction products that interpose themselves between groups of reactants. This category of moderators remain in the system and may sinter together with reaction products (e.g., alumina). Thus, one may use an excess of metallic oxide; the surplus acts as a moderator; this moderator also remains in the system and may sinter with the products (e.g., excess silica). One may also use compounds which react with the products; these secondary products can take part in subsequent sintering processes (e.g., carbon).

In one preferred embodiment, illustrated in FIG. 1, a green body additive (such as, e.g., a lubricant) is added to mill 10 via line 20. In general, from about 1 to about 5 weight percent of such green body additive (by total weight of aluminum, carbon, silica, and additive) may be added to mill 10.

As is known to those skilled in the art, green body additives may be dispersants, binders, lubricants, and the like.

In one preferred embodiment, the green body additive is a lubricant and/or binder. Typical binders and lubricants which may be used include unsaturated fatty acids (such as, e.g., stearic or oleic acid), organic materials, starches, gums, waxes, dextrine, corn flower, polyvinyl alcohol, marine derivatives, lignin extracts, methyl cellulose, and the like. It is preferred that the binder and/or lubricant used burn out of the ceramic body at temperatures below 500 degrees centigrade so that they will not interfere with combustion-synthesis reactions which occur at higher temperatures.

When a binder is used, it preferably is organic. Preferred organic binders include natural gums (such as xanthan gum, gum arabic, and the like), polysaccharides (such as refined starch, dextrine, and the like), lignin extracts (such as paper liquor), refined alginate (such as sodium or ammonium alginate), cellulose ethers (such as methyl cellulose, hydroxyethyl cellulose, sodium carboxymethyl cellulose, and the like), polymerized alcohols (such as polyvinyl alcohol), other vinyl binders (such as polyvinyl acetate, polyacrylamide, polyvinyl pyrolidone, and the like), polymerized butyral (such as polyvinyl butyral), acrylic resins (such as polymethyl methacrylate), glycols (such as polyethylene glycol), waxes (such as paraffin, bee's wax, wax emulsions, microcrystalline wax, and the like), and the like.

Another preferred class of binders are the waxes. Common waxes used as film-type binders are paraffin derived from petroleum, candelella and carnuba waxes derived from plants, and beeswax of insect origin. Paraffins are mixtures of straight-chain saturated hydrocarbons which tend to crystallize as plates or needles. Microcrystalline waxes are branched chain saturated hydrocarbons also derived from petroleum. The plant waxes are more complex mixtures of straight chain hydrocarbons, esters, acids, and alcohols that are relatively hard and have a relatively hard melting point of 85-90 degrees centigrade.

In one embodiment, the green body additive is a lubricant. As is known to those skilled in the art, lubricants are materials which facilitate the flow of nonplastic, or poorly plastic, materials in the formation of dense compacts; and they are especially useful in dry pressing.

By way of illustration and not limitation, typical lubricants which may be used include kerosene, lard oil (also known as die oil), graphite, talc, clay, mica, number 4 fuel oil, stearic acid, stearates, dispersed stearates, cetyl alcohol, camphor, mineral oils, starches, alginates, polyvinyl alcohol, polyvinyl acetate, wax emulsions, solid waxes, methyl cellulose, and the like.

The function of the lubricant is create a better flow of the comminuted mixture during comminution and, thereafter, during the granulating and pelletizing steps of this material. In general, any material known to facilitate such flow may be used. Thus, as is known to those skilled in the art, one may use lubricants such as fatty acids containing from about 10 to about 24 carbon atoms which can be monocarboxylic or dicarboxylic. Suitable fatty acids include acids such as caprylic acid, capric acid, lauric acid, myristic acid, palmitic acid, stearic acid, oleic acid, linoleic acid, erucic acid, brasidic acid, elaidic acid, stearolic acid, mixtures thereof, and the like. Other suitable lubricants include fats corresponding to said fatty acids. Stearic acid is a preferred lubricant. By way of illustration, one suitable stearic acid may be obtained from the Aldrich Chemical Company of 940 West Saint Paul Avenue, Milwaukee, Wis. (catalog number 17,536-6 of the 1986-1987 Aldrich catalog).

In one embodiment, the lubricant added via line 20 is paraffin wax. In another embodiment, the lubricant is a hydrocarbon which is a solid at room temperature and ambient pressure.

The reagents in mill 10 are comminuted until a substantially single-phase material is produced. Samples of the comminuted material may be periodically removed from mill 10 via line 22 and analyzed in laboratory 24.

As used in this specification, the term "phase" refers to a separate, but homogeneous, fraction of a system. The use of a scanning electron microscope to determine the number of phases in a ceramic material is well known to those skilled in the art. See, e.g., pages 443-456 of Volume 8 of the "McGraw-Hill Encyclopedia of Science & Technology," supra; C. W. Oatley, W. C. Nixon, and R. F. W. Pease, "Scanning electron microscopy, Advances in Electronics and Electron Physics," vol. 21, 1965; and pages 132-136 of J. T. Jones and C. F. Berard's "Ceramics: Industrial Processing and Testing," (The Iowa State University Press, Ames, Iowa, 1972).

A determination of whether the reaction mixture in mill 10 is single-phase may be made by scanning electron microscopy. Single phase compositions were discussed in applicant's Ph.D. thesis entitled "Study of Solid-State Aluminothermal Reactions: Influence of Activation and Moderation Processes," which was submitted to the Senate of the Technion—Israel Institute of Technology in Haifa, Israel in February of 1987, and which was published in April of 1987. By way of illustration, FIGS. 5-11 to 5-13 of such thesis (at page 79) illustrate substantially single phase compositions.

Mill 10 may be any conventional mill such as, e.g., a high-speed rotary ball mill, a vibratory ball mill, a jet mill, an attrition mill, a high speed hammer mill, and the like. The function of each of these comminution means should preferably be to introduce mechanical energy into the materials through an increase of surface energy and stored elastic strain energy and to increase the density of contact points between the reactants.

Mill 10 may be a vibratory mill. Vibratory mills are described on pages 8-29 to 8-30 of Robert H. Perry and Cecil H. Chilton's "Chemical Engineers' Handbook," Fifth Edition (McGraw-Hill Book Company, New York, 1973), the disclosure of which is hereby incorporated by reference into this specification. Thus, by way of illustration and not limitation, one may use a Sweco Vibratory Mill; suitable models include models M-18, M-45, M-60, and M-80; the operation of the Sweco vibratory mills is described in a publication entitled "SWECO Vibro-Energy Grinding Mills," revised 1986 (Sweco, Inc., Florence, Ky., 1986), the disclosure of which is hereby incorporated by reference into this specification. Thus, e.g., one may use an Allis-Chalmers Vibratory Mill; suitable models include models 1518-D, 3034-D, 3640-D, and 4248-D. Thus, e.g., one may use a Podmore-Boulton mill. Other manufacturers of vibratory ball mills (and other grinding equipment) are listed on page 79 of "Ceramic Source," Volume 3, 1987 (American Ceramic Society, Westerville, Ohio, 1987), the disclosure of which is hereby incorporated by reference into this specification.

High-intensity mill 10 may be a high-speed centrifugal mill such as, e.g., the mills described in sections 7 and 10 of catalog R1, Brinkman Instruments Co., Cantiague Road, Westbury, N.Y. 11590 (printed in West Germany in August, 1986), the disclosure of which is hereby incorporated by reference into this specification.

Once a substantially single-phase material has been produced in mill 10, such material may be discharged via line 26 to granulator 28. In granulator 28, the substantially single-phase material is granulated until substantially all of the particles of the material have a largest dimension which is from about 50 to about 2,000 microns. In one preferred embodiment, the substantially single-phase material is granulated until substantially all of its particles have a largest dimension which is from about 200 to about 2,000 microns.

Any of the granulators well known to those skilled in the art may be used. Thus, by way of illustration, one may use any of the granulators sold by the companies listed on page 98 of the Sept. 15, 1990 issue of Ceramic Industry. In one preferred embodiment, an Eirich mixer is used as granulator 28.

Those skilled in the art are familiar with the Eirich machines and their use in mixing solids and/or pelletizing. Reference may be had, e.g., to an article entitled "Mixing Techniques and Mixing Equipment," first published in Aufberteitungs-Teklchnick 1976 and republished in publication 10052-us-2000-683 by Eirich Machines Ltd. of 521 Fifth Avenue, New York, N.Y. Reference also may be had to other Eirich publications entitled "Eirich Intensive Mixers—The complete range of mixers" (GM 885-4us), "Eirich Intensive Mixer for vacuum or pressure operation (Edition 35 e/486), "Eirich Type R Intensive Mixer," and the like.

Samples may be periodically removed from granulator 28 via line 30 to laboratory 32 to determine when the desired degree of granulation has been obtained.

The granulated material from granulator 28 may be discharged via line 34 to pelletizer 36. Any apparatus known to those skilled in the art which can produce a green body from granulated material may be used as pelletizer 36.

In one preferred embodiment, pelletizer 36 is a press. Any conventional press may be used to form a green body from the granulated material. Thus, for example, one may use the presses described in Chapter 19 of Robert H. Perry and Cecil H. Chilton's "Chemical Engineers' Handbook," Fifth Edition (McGraw-Hill Book Company, New York, 1973). Thus, e.g., one may use a hydraulic press. Thus, e.g., one may use the pressure compaction techniques described on pages 8-58 to 8-60 of said Perry and Chilton book.

In one embodiment, the press used is single-action hydraulic press such as, e.g., a Carver Laboratory Press 13-872 (see page 897 of the Fischer '88 catalog, Fischer Scientific, Pittsburgh, Pa.).

Sufficient pressure should be used during the formation of a green body so that the green body produced will have sufficient strength to be handled without disintegration. In one preferred embodiment, a sufficient amount of pressure is used so that the density of the green body produced will be at least about 60 percent of the theoretical density of sintered material. In another preferred embodiment, the density of the green body will be from about 65 to about 85 percent of said theoretical sintered body.

The green body formed may be substantially of any shape or size. As long as the green body formed in the pelletizing step has sufficient structural integrity to be handled, it may be used in the process.

The green body or bodies formed in pelletizer 36 may be passed via line 38 to oven 40. In oven 40, the green body or bodies are heated to a temperature sufficient to insure that it has less than about 1.0 weight percent of moisture and less than about 1.0 weight percent of organic matter in it prior to the time it is subjected to reaction-sintering.

As is known to those skilled in the art, the temperature and time required for drying and burn out will vary with conditions such as, e.g., the thickness of the green body, the humidity, the air velocity, etc.

It is often required to heat the green body to a temperature of at least about 500 degrees centigrade to burn out the hydrocarbon matter in it.

When in oven 40, the green body or bodies are preferably subjected to a temperature of from about 400 to about 600 degrees centigrade. It is more preferred that a temperature of from about 400 to about 500 degrees centigrade be used in oven 40.

It is preferred to insert the green body or bodies into oven 40 when such oven is at no higher than about ambient temperature and, thereafter, raise the temperature of the oven at a rate of not more than about 5.0 degrees centigrade per minute.

In one preferred embodiment, the burn out is conducted under a pressure of less than about 700 millimeters of mercury and, more preferably, less than about 100 millimeters of mercury.

The debindered green bodies are then discharged from oven 40 via line 42 to reactor 44. These debindered green bodies may be ignited and be caused to undergo reaction-sintering by being subjected to a suitable source of heat. In general, the debindered green body should be heated to a temperature in excess of about 600 degrees Centigrade to cause such ignition.

It will be apparent to those skilled in the art that, although the debindering and the reaction sintering are separate steps in applicant's process, they may be conducted in the same furnace. Thus, for example, the temperature of the oven may be slowly raised until the green body is substantially dried and debindered. Thereafter, the temperature of the oven may continue to be raised until it is sufficient to cause ignition of the debindered green body, combustion, and sintering.

The debindered green body may be heated to the desired ignition temperature by any of several means. In one embodiment, not shown, the body is placed in a furnace, blanketed with protective atmosphere (such hydrogen, a mixture of argon and hydrogen, etc.) and then heated to a temperature of at least about 600 degrees Centigrade.

The function of the protective atmosphere is to shield the debindered green body from oxygen and/or nitrogen. Thus, the hydrogen acts as a protective atmosphere by reacting with the oxygen which either is in the atmosphere or is generated by the reaction-sintering; other gases (such as, e.g., carbon monoxide) which function in the same manner also may be used.

When a mixture of the inert gas (such as argon) and the oxygen-catching gas (such as hydrogen) is used, it is preferred to use at least about 50 volume percent of the inert gas and, preferably, at least about 75 volume percent of the inert gas.

Once the debindered green body has been placed into the furnace and blanketed with one or more protective gases, it is preferred to raise the temperature from ambient to a temperature which is at least about 100 degrees Centigrade in excess of the temperature at which ignition occurs at a rate of from about 10 to about 30 degrees Centigrade per minute.

The ignition temperature of the debindered green body may be determined by means of differential thermal analysis ("DTA"). As is known to those skilled in the art, in differential thermal analysis thermocouples in contact with a specimen and a reference material indicate the test temperature and any differential temperature due to an endothermic or exothermic transition or reaction in the sample as a function of temperature or time.

In performing the DTA analysis, a sample of the debindered green body is subjected to evaluation while under the protective atmosphere which will be used in the reaction-sintering.

In one preferred embodiment, the debindered green body is first placed into a graphite retort prior to the time it is heated in a furnace. In one aspect of this embodiment, the debindered green body is placed into the retort without any packing material surrounding it. In another aspect of this embodiment, the debindered green body is placed in the retort and packed with inert powder. As used in this specification, the term inert powder refers to powder which will not enter into any of the reaction-sintering reactions with any of the chemical species which are either in the debindered green body and/or are generated during the reaction-sintering.

Some suitable inert packing powders which may be used include, e.g., metal oxides such as alumina, magnesia, zirconia, and the like; graphite and/or carbon powder; carbides, such as silicon carbide, titanium carbide, tungsten carbide, and the like; mixtures of the above; and the like.

In one embodiment, the packing powder used functions as a source of heat to ignite the debindered green body. In this embodiment, thermite-type powder mixtures may be used; and, after they are ignited, they in turn generate sufficient heat to ignite the debindered green body.

A thermite powder mixture which, upon ignition, generates a temperature which is at least about 100 degrees centigrade higher than the ignition temperature of the debindered green body, may be used. However, the thermite powder should be such that, after its ignition, it does not produce a liquid phase.

Those skilled in the art are well aware of the identity of those thermite powders which, after ignition, produce only solid phases. Thus, by way of illustration and not limitation, one may use a mixture of silicon dioxide and aluminum, a mixture of titania and aluminum, a mixture of zirconia and aluminum, a mixture of tungsten oxide and aluminum, and the like. As will be evident to those skilled in the art, one may also use other metal oxides (such as, e.g., the transition metal oxides) and/or other elemental reducing agents (such as lanthanum, barium, silicon, and the like).

In one preferred embodiment, the thermite powder is a mixture of silica and aluminum, in stoichiometric ratio.

When a thermite packing powder is used, it may be ignited by suitable means such as a hot wire, a laser beam, etc.

It is preferred to place the retort containing the debindered green body packed in the packing powder into a furnace which is blanketed with the aforementioned protective atmosphere prior to the time the body is ignited. After being so placed into the furnace and covered with the atmosphere, the heat source (either the furnace, or the thermite mixture, or both) is then applied to the body to ignite it.

Once the debindered green body has been ignited, it undergoes a self-propagating reaction which causes it to synthesize the carbide and to sinter the body.

The debindered pellets in reactor 44 undergo both reaction synthesis and sintering. The product produced by process is a densified material.

In one embodiment, the combusted and sintered body may be used as is. In another embodiment, the sintered body is crushed to obtain the sintered grains therein.

The latter embodiment is illustrated in FIG. 1. Referring again to FIG. 1, the sintered body from reactor 44 is passed via line 46 to crusher 48, in which it is crushed so that substantially all of its particles have a maximum dimension which is less than about 2.0 millimeters.

The crushed material from crusher 48 may then be passed via line 50 to siever 52, in which such material may be classified. Any conventional classifying means may be used as siever 52. In one embodiment, described below, siever 52 is a multi-deck vibratory sieve.

Separation of solids by screening and sieving is well known to those skilled in the art and is described, e.g., on pages 21-37 to 21-44 of said Perry and Chilton's "Chemical Engineers' Handbook," the disclosure of which is hereby incorporated by reference into this specification.

In one preferred embodiment, the crushed material from crusher 48 is passed to a multivibratory sieve.

By way of illustration, siever 52 may be a four-deck vibratory sieve. Thus, in this embodiment, the crushed pellets may be passed via line 50 to four-deck vibratory sieve 52. In this embodiment, The vibratory sieve 52 preferably has at least four sieves which sequentially screen the combusted pellets and a collecting pan beneath the finest sieve.

In this embodiment, the first screen in the vibratory sieve, into which the combusted pellets are first discharged, is 8 mesh (2 millimeters sieve opening). Material which passes through this sieve is then passed to the second vibratory sieve.

The second screen in the vibratory sieve is 16 mesh (1 millimeter sieve opening). Material which passes through the second sieve is passed to the third vibratory sieve.

The third vibratory sieve is 28 mesh (0.6 millimeter opening). Material which passes through this third sieve is primarily silicon carbide/alumina sintered material, and it passes to the fourth vibratory sieve.

The fourth vibratory sieve is 60 mesh (0.25 millimeter opening). The material which passes through this sieve is collected on the bottom pan.

Preparation of other Sintered Composite Materials

The process described above for the preparation of a sintered silicon carbide/alumina composite material may also be used to prepare sintered materials containing other metal carbides together with alumina. In general, except for a change in the concentrations of the reactants, substantially the same process is utilized.

When it is desired to produce another metal carbide, one should replace the silica with the appropriate metal oxide. Thus, for example, one may replace the silica with, e.g., an oxide of a transition metal. As is known to those skilled in the art, the transition metals include molybdenum, titanium, niobium, tantalum, zirconium, hafnium, cobalt, vanadium, tungsten, chromium, manganese, nickel, and the like.

Thus, by way of illustration, one may prepare a $V_2C$/alumina composite material by a process in which 3 moles of vanadium pentoxide ($V_2O_5$) are reacted with 10 moles of aluminum and 3 moles of carbon to obtain a composite material containing 3 moles of $V_2C$ and 5 moles of alumina. In this reaction, one may use $V_2C$ and/or alumina as a moderator.

Alternatively, one may prepare $V_2C$/alumina composite by a process in which vanadium trioxide ($V_2O_3$) is used as a reactant. In this embodiment, one mole of vanadium trioxide is reacted with 2 moles of aluminum and 1 mole of carbon, to produce a composite material containing 1 mole of $V_2C$ and 1 mole of alumina. One also may use $V_2C$ and/or alumina as a moderator in this reaction.

Alternatively, one may produce vanadium carbide (VC)/alumina composite by reacting 3 moles of vanadium pentoxide ($V_2O_5$) with 10 moles of aluminum and 6 moles of carbon, to obtain 6 moles of vanadium carbide and 5 moles of alumina. In this reaction, vanadium carbide and/or alumina may be used as moderator.

Alternatively, one may produce a vanadium carbide/alumina composite material by reacting 1 mole of vanadium trioxide with 2 moles of aluminum and 2 moles of carbon, to obtain 2 moles of vanadium carbide and 1 mole of alumina. Either vanadium carbide and/or alumina may be used as moderator.

One may prepare diniobium carbide ($Nb_2C$) by reacting 3 moles of niobium pentoxide ($Nb_2O_5$) with 10 moles of aluminum and 3 moles of carbon to obtain 3 moles of diniobium carbide and 5 moles of alumina. Either diniobium carbide and/or alumina may be used as moderator.

One may prepare niobium carbide (NbC) by reacting 3 moles of niobium pentoxide with 10 moles of aluminum and 6 moles of carbon, to obtain 6 moles of niobium carbide and 5 moles of alumina. Either niobium carbide and/or alumina may be used as moderator.

One may prepare ditantalum carbide ($Ta_2C$) by reacting 3 moles of tantalum pentoxide ($Ta_2O_5$) with 10 moles of aluminum and 3 moles of carbon, to obtain 3 moles of ditantalum carbide and 5 moles of alumina. One may use alumina and/or ditantalum carbide as moderator.

One may prepare tantalum carbide (TaC) by reacting 3 moles of tantalum pentoxide with 10 moles of aluminum and 6 moles of carbon, to obtain 6 moles of tantalum carbide and 5 moles of alumina. One may use alumina and/or tantalum carbide as moderator.

One may prepare trichromiumdicarbide ($Cr_3C_2$) by reacting 3 moles of chromium trioxide ($CrO_3$) with 6 moles of aluminum and 2 moles of carbon, to obtain 1 mole of trichromiumdicarbide and 3 moles of alumina. Either alumina and/or trichromium dicarbide may be used as moderator.

Alternatively, one may prepare trichromiumdicarbide by reacting 3 moles of dichromiumtrioxide ($Cr_2O_3$) with 6 moles of aluminum and 4 moles of carbon, to obtain 2 moles of trichromiumdicarbide and 3 moles of alumina. As will be apparent to those skilled in the art, by using different oxides as reactant(s), and/or mixed oxides, and/or by varying the mole ratio of the reactants, the composition of the composite material produced can be changed.

One may prepare dimolybdenum carbide ($Mo_2C$) by reacting 2 moles of molybdenum trioxide ($MoO_3$) with 4 moles of aluminum and 1 mole of carbon, to obtain 1 mole of dimolybdenum carbide and 2 moles of alumina. One may use as moderator alumina and/or dimolybdenum carbide.

One may prepare molybdenum carbide (MoC) by reacting 1 mole of molybdenum oxide with 2 moles of aluminum and 1 mole of carbon, to obtain 1 mole of molybdenum carbide and 1 mole of alumina. One may use alumina and/or molybdenum carbide as moderator.

One may prepare ditungsten carbide ($W_2C$) by reacting 2 moles of tungsten trioxide ($WO_3$) with 2 moles of aluminum and 1 mole of carbon, to produce 1 mole of ditungsten carbide and 2 moles of alumina. Alumina may be used as moderator in this reaction, but it is preferred not to use ditungsten carbide as moderator.

One may prepare tungsten carbide (WC) by reacting 1 mole of tungsten trioxide with 2 moles of aluminum and 1 mole of carbon, to produce 1 mole of tungsten carbide and 1 mole of alumina. It is preferred not to use moderator in this reaction.

One may prepare trimanganese carbide ($Mn_3C$) by reacting 3 moles of $Mn_3O_4$ with 8 moles of aluminum and 3 moles of carbon, to produce 3 moles of trimanganese carbide and 4 moles of alumina. Alumina may be used as moderator, but it is preferred not to use trimanganese carbide as moderator.

Alternatively, one may prepare trimanganese carbide by reacting 3 moles of manganese dioxide ($MnO_2$) with 4 moles of aluminum and 1 mole of carbon, to produce 1 mole of trimanganese carbide and 2 moles of alumina. In this reaction, and in the other reactions described, mixtures of oxides can be used to obtain different ratios of carbide and alumina.

One may prepare zirconium carbide (ZrC) by reacting 3 moles of zirconia ($ZrO_2$) with 4 moles of aluminum and 3 moles of carbon, to obtain 3 moles of zirconium carbide and 2 moles of alumina.

Mixed carbides may be obtained by using mixed oxides as starting material. Thus, one may prepare zirconiumtantalumcarbide ($ZrTaC_2$) by reacting 2 moles of zirconia, 1 mole of tantalum pentoxide ($Ta_2O_5$), 6 moles of aluminum, and 4 moles of carbon, to produce 2 moles of $ZrTaC_2$ and 3 moles of alumina. Carbide(s) and/or alumina may be used as moderator.

One may produce hafniumtantalumdicarbide ($HfTaC_2$) by substituting hafnia for zirconia in the aforementioned reaction. If one were to substitute niobium pentoxide for tantalum pentoxide in the aforementioned reaction, one obtains $ZrNbC_2$. In a like manner, one may produce $TiTaC_2$ (by substituting titania for zirconia), $TiNbC_2$ (by substituting titania for zirconia and niobium pentoxide for tantalum pentoxide), $TiVC_2$ (by substituting titania for zirconia, and vanadium pentoxide for tantalum pentoxide), $TiWC_2$ (by reacting titania with tungsten trioxide, aluminum, and carbon), $W_3Co_3C$ (by reacting 3 moles of tungsten trioxide with 3 moles of cobalt oxide, 8 moles of aluminum, and 1 mole of carbon), $W_3Ni_3C$ (by reacting 3 moles of tungsten trioxide with 3 moles of nickel oxide, 8 moles of aluminum, and 1 mole of carbon), $WTaTiC_3$ (by reacting 2 moles of tungsten oxide, 1 mole of tantalum pentoxide, and 2 moles of titania with 10 moles of aluminum and 6 moles of carbon), $WCr_3C_3$ (by reacting 1 mole of $WO_3$ with 3 moles of chromium oxide, 8 moles of aluminum, and 3 moles of carbon), and the like.

The following example is presented to illustrate the claimed invention but is not to be deemed limitative thereof. Unless otherwise specified, all parts are by weight and all temperatures are in degrees centigrade.

EXAMPLE 1

28.4 grams of silica quartz sand (which contained 99.82 weight percent of silica and all of whose particles were smaller than 62 microns), 17.7 grams of coated aluminum powder (which contained 94 percent of aluminum and all of whose particles were smaller than 44 microns), 5.5 grams of carbon black (which contained 99.28 weight percent of carbon, had a median agglomerated particle size of 648 angstroms, and all of whose agglomerated particles were smaller than 0.5 millimeters), 10 grams of calcined alumina (all of whose particles were smaller than 53 microns), and 0.5 milliliter of oleic acid were charged to a jar equipped with 359 grams of tungsten carbide media and was milled for 4.0 hours in a centrifugal mill.

The material thus milled was then formed into pellets with a Carver Laboratory Press (see page 897 of the Fischer '88 catalog, Fischer Scientific, Pittsburgh, Pa.). The pellets thus formed had a 1.0" diameter and a thickness of 0.25".

The pellets were then dried by heating them in an oven at 400 degrees Centigrade for 8 hours. Calcined alumina (all of whose particles were smaller than 53 microns) was then placed on the bottom and the sides of a crucible, the pellets were then charged to the coated crucible, and the were covered with more of such alumina so that they were completely covered with it. The packed pellets were then introduced into a furnace which had been preheated to a temperature of 600 degrees centigrade. Thereafter, the temperature of the furnace was raised to 800 degrees centigrade. During this heating, ignition of the pellets occurred.

The combusted pellets were allowed to cool to ambient within the furnace, and they were then removed. The pellets were then cleaned manually to remove alumina, and the density of the cleaned pellets was determined. The pellets had a density which was 94 percent of its theoretical density.

The pellets were cut into small pieces diamond saw, and the surfaces of the cut pieces wee polished with silicon carbide powder. Thereafter, the polished pieces were examined with a scanning electron microscope. Analysis indicated a material with a fine microstructure, uniform distribution of the silicon carbide phase within the alumina matrix, strong bonds between the silicon carbide and the alumina, and uniform micropores. No large voids were observed.

EXAMPLE 2

The procedure of Example 1 was substantially followed, with the exception that the alumina was replaced with silicon carbide, both in the initial charge and as the powder used for packing the pellets.

The reaction-sintered product produced in this experiment had a density of 91 percent of its theoretical density. Some large voids were noticed in the microstructure of the product.

It is to be understood that the aforementioned description illustrative only and that changes can be made in the apparatus, the ingredients and their proportions, and in the sequence of combinations and process steps as well as in other aspects of the invention discussed herein without departing from the scope of the invention as defined in the following claims.

I claim:

1. A process of preparing a sintered composite material comprised of alumina and silicon carbide, comprising the steps of sequentially:
   (a) providing a mixture comprised of from about 17 to about 34 percent of aluminum from about 11 to about 24 percent of amorphous carbon, and from about 55 to about 63 percent of silica, based on total weight of aluminum, carbon, and silica, wherein:
      1. said aluminum has a specific surface area of from about 0.2 to about 1.1 square meters per gram, has a particle size distribution which ranges from about 4 to about 28 microns, and has at least 80 weight percent of its particles in the range of from about 6 to about 12 microns.
      2. said amorphous carbon has a specific surface area of at least about 4 square meters per gram, and
      3. said silica has a specific surface area of from about 1.2 to about 400 square meters per gram;
   (b) comminuting said mixture until a substantially single-phase material is produced;
   (c) granulating said single-phase material until substantially all of the particles in the material have a maximum dimension of from about 50 to about 2,000 microns;
   (d) forming said granulated material into a green body;
   (e) heating said green body to a temperature of from about 400 to about 600 degrees centigrade;
   (f) packing said green body in an inert powder, thereby forming an inert-powder/green body assembly; and
   (g) heating said inert-powder green body assembly to a temperature of from about 700 to about 900 degrees centigrade, thereby causing said green body to ignite, to combust, and to produce a sintered body.

2. The process as recited in claim 1, wherein said mixture comprised of aluminum, carbon, and silica is also comprised of from about 0.05 to about 0.3 parts, based on total weight of said aluminum, carbon, and silica, of a moderator.

3. The process as recited in claim 1, wherein said mixture comprised of aluminum, carbon, and silica is also comprised of from about 1 to about 5 weight percent, based on total weight of said aluminum, carbon, and silica, of a green body additive.

4. The process as recited in claim 3, wherein said green body additive is a lubricant.

5. The process as recited in claim 4, wherein said lubricant is a fatty acid containing from about 10 to about 24 carbon atoms.

6. The process as recited in claim 5, where said fatty acid is selected from the group consisting of caprylic acid, capric acid, lauric acid, myristic acid, palmitic acid, stearic acid, oleic acid, linoleic acid, erucic acid, brasidic acid, elaidic acid, stearolic acid, and mixtures thereof.

7. The process as recited in claim 6, wherein said fatty acid is stearic acid.

8. The process as recited in claim 1, wherein said single-phase mixture is granulated until substantially all of its particles have a maximum dimension of from about 200 to about 2,000 microns.

9. The process as recited in claim 1, wherein said green body is raised to a temperature of from about 400 to about 600 degrees centigrade at a rate of not more than 5.0 degrees centigrade.

10. The process as recited in claim 1, wherein, while said green body is heated to a temperature of from about 400 to about 600 degrees centigrade, it is subjected to a pressure of less than about 700 millimeters of mercury.

11. The process as recited in claim 1, wherein, while said green body is heated to a temperature of from about 400 to about 600 degrees centigrade, it is subjected to a pressure of less than about 100 millimeters of mercury.

12. The process as recited in claim 1 wherein said sintered body is crushed so that substantially all of the crushed particles are smaller than about 2.0 millimeters.

13. The process as recited in claim 12 wherein said crushed particles are sieved.

14. The process as recited in claim 1, wherein step (d) produces a plurality of green bodies which are subjected to steps (e), (f) and (g).

* * * * *